United States Patent [19]
Shibata et al.

[11] Patent Number: 5,313,104
[45] Date of Patent: May 17, 1994

[54] VEHICLE CONTROL SYSTEM OVER A PLURALITY OF TRANSMISSION LINES

[75] Inventors: Mineharu Shibata, Ohtake; Yasuhiko Matsumura, Hatsukaichi; Nagahisa Fujita; Masao Hideshima, both of Hiroshima, all of Japan

[73] Assignee: Mazda Motor Corporation, Hiroshima, Japan

[21] Appl. No.: 14,008

[22] Filed: Feb. 5, 1993

Related U.S. Application Data

[63] Continuation of Ser. No. 743,205, Aug. 9, 1991, abandoned.

[30] Foreign Application Priority Data

Aug. 10, 1990 [JP] Japan .................. 2-213448

[51] Int. Cl.⁵ .................. H02J 13/00; B60R 16/02
[52] U.S. Cl. .................. 307/10.1; 307/40
[58] Field of Search .................. 307/9.1, 10.1, 38–40; 364/424.05, 424.01; 370/85.1, 85.2, 84, 85.3, 85.13, 85.14, 85.9, 85.11

[56] References Cited

U.S. PATENT DOCUMENTS

| | | | |
|---|---|---|---|
| 4,290,134 | 9/1981 | Hampshire | 370/92 |
| 4,532,594 | 7/1985 | Hosaka et al. | 364/431.11 |
| 4,584,487 | 4/1986 | Hesse et al. | 307/9.1 |
| 4,594,571 | 6/1986 | Neuhaus et al. | 307/10.1 X |
| 4,654,890 | 3/1987 | Hasegawa et al. | 455/607 |
| 4,697,094 | 9/1987 | Palazzetti | 307/40 |
| 4,760,275 | 6/1988 | Sato et al. | 307/10.1 |
| 4,956,561 | 9/1990 | Tamer | 307/10.1 |
| 5,091,856 | 2/1992 | Hasegawa et al. | 364/424.05 |

FOREIGN PATENT DOCUMENTS

| | | |
|---|---|---|
| 3226195 | 2/1983 | Fed. Rep. of Germany . |
| 3335932 | 4/1985 | Fed. Rep. of Germany . |
| 64-36541 | 2/1989 | Japan . |

*Primary Examiner*—A. D. Pellinen
*Assistant Examiner*—F. M. FLeming

[57] ABSTRACT

A vehicle control system having plurality of control units, as well as sensors and actuators having a comparatively high degree of importance in terms of control by these control units, which are separately connected to first and second transmission lines. Sensors and actuators having a comparatively low degree of importance are assigned to the second transmission line. The outputs from the comparatively important sensors enter the respective control units directly via the first transmission line. A back-up program for backing up one control unit in case of failure is stored beforehand in another control unit. If the control unit fails, the other control unit performs back-up control to take over its tasks.

5 Claims, 9 Drawing Sheets

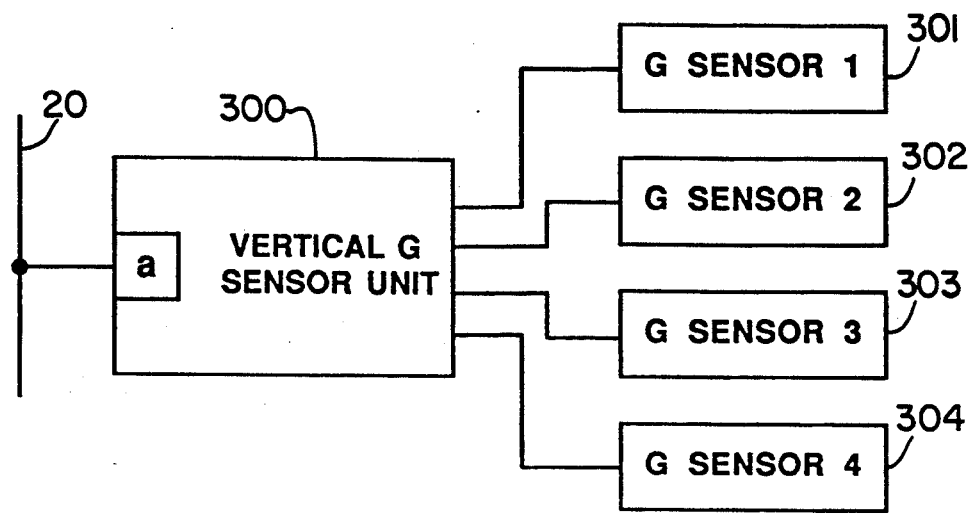
F I G. 3
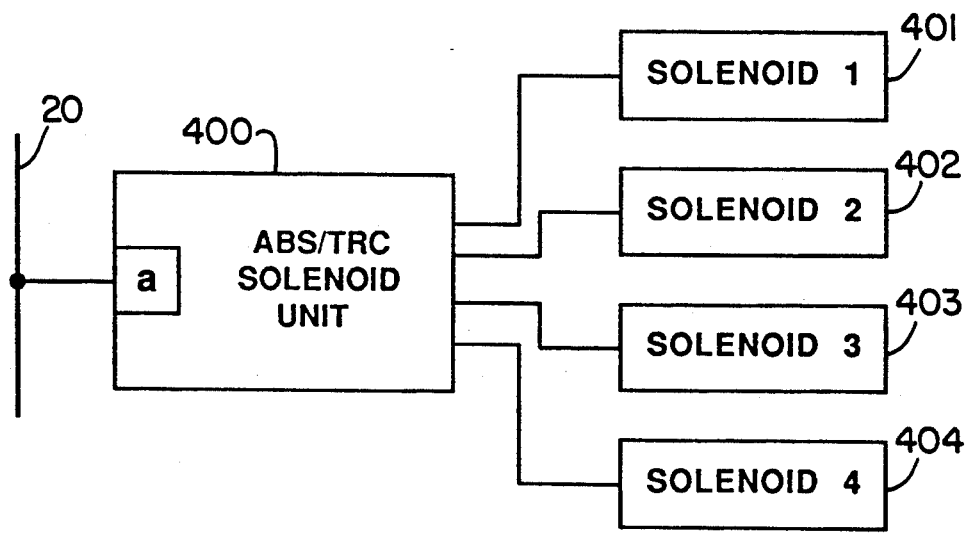
F I G. 4

VEHICLE CONTROL SYSTEM OVER A PLURALITY OF TRANSMISSION LINES

This application is a continuation of application Ser. No. 07/743,205, filed Aug. 9, 1991, now abandoned.

BACKGROUND OF THE INVENTION

This invention relates to a vehicle control system in which a control unit, sensors and actuators are connected by a transmission circuit.

In modern automotive vehicles, greater emphasis upon electronics has made it possible for such vehicles to be equipped with a large number of electronic devices, and this has resulted in a marked increase in the number of wire harnesses used. Accordingly, in order to reduce the number of wire harnesses used in a vehicle, a transmission system in which a wide variety of signals are transmitted by a single wire harness has been proposed.

Specifically, the specification of Japanese Patent Application Laid-Open (KOKAI) No. 64-36541 discloses a multiplexed transmission system for the body accessories of an automotive vehicle. The multiplexed transmission system is installed in an automotive vehicle and uses a multiplexed transmission circuit to connect a variety of electronic devices provided on the vehicle body. By way of example, these devices include an air conditioner, a car stereo, lamps, wipers and power windows, as well as various meters such as a thermometer for measuring water temperature, a speedometer, etc.

In addition to the above-mentioned electronic devices associated with the body of the vehicle, modern automotive vehicles also come equipped with various electronic devices associated with control of vehicle travel. These electronic devices include an ACS (active suspension), 4WS (four-wheel steering), ABS (antilock braking system), TRC (traction control) and a control device for controlling the traveling state of the vehicle, such as EGI (fuel injection control). It would be desirable to apply a multiplexed transmission system to these electronic devices for control of vehicle travel in the same way as such a system is applied to the electronic devices associated with the vehicle body.

The reason for this is that each of these control devices for vehicle travel, such as the ACS or 4WS, is equipped with its own control unit, various sensors necessary for control, and actuators which undergo control. Since these devices use many more wire harnesses than the electronic devices for the body system, it would be particularly advantageous to reduce the number of associated wires by applying a multiplexed transmission system to these devices. For example, in a case where the same sensor is required by two different devices for controlling vehicle travel, the practice in the prior art is to connect this sensor directly to the control units of the respective control devices for vehicle travel. However, if a multiplexed transmission system is applied to a plurality of such control devices for vehicle travel, it can be so arranged that the sensor is connected solely to one of the control units, with the signal produced by the sensor being applied to the other control units from the first-mentioned control unit via a multiplexed transmission line (i.e., a bus). This is advantageous because it eliminates the need to connect the sensor to each of the control units individually.

A system of the kind shown in FIG. 10 is conceivable as one example in which a multiplexed transmission system is applied to a plurality of the control devices for vehicle travel mentioned above.

In this system, control units 6, 8, 10, 12 of various control devices for vehicle travel, as well as a combination switch unit 2 and a meter unit 4, are connected to a bus 14 serving as a multiplexed transmission line, and various sensors and actuators (solenoids, a flowrate control valve, a cut-off valve and an injection driver) are connected to these control units 6, 8, 10, 12. Furthermore, in a case where a sensor which outputs a signal necessary for a certain control unit (hereinafter referred to as C/Ua) is connected to another control unit (hereinafter referred to as C/Ub), the output signal from this sensor is inputted to the other control unit (C/Ub) via the bus without being connected to the first-mentioned control unit (C/Ua). For example, the arrangement of FIG. 10 is such that a prescribed switch signal necessary for control produced by the meter unit 4, a steering-angle signal produced by a 4WS control unit 6, and a throttle-opening signal and gear-position signal produced by an EGI control unit 12, are inputted to an ABS/TRC control unit 8 via the bus 14.

A problem with the multiplexed transmission system shown in FIG. 10 is that when a certain control unit (C/Ua) develops a fault, another control unit (C/Ub) which receives its input signal via the faulty control unit is no longer capable of receiving this signal. For example, if the 4WS control unit 6 fails, the steering-angle signal applied to the ACS control unit 10 and ABS/TRC control unit 8 from the control unit 6 via the bus 14 is no longer capable of entering the units 8 and 10. This is an impediment to ACS control and ABS/TRC control.

Further, it is desired that a 4WS control program for back-up be stored in the ABS/TRC control unit 8 along with an ABS/TRC control program, by way of example. Then, in the event that the 4WS control unit 6 should fail, 4WS control can be backed up by the ABS/TRC control unit 8. However, with the system shown in FIG. 10, the actuator (solenoid) that participates in 4WS control is connected to the 4WS control unit 6. Consequently, even if the 4WS control program for backup is stored in the ABS/TRC control unit 8, back-up control will be impossible if the 4WS control unit 6 fails. This is another problem that arises in the prior art.

Accordingly, there is demand for a multiplexed transmission system which solves the aforementioned problems through an arrangement that is as inexpensive as possible.

SUMMARY OF THE INVENTION

Accordingly, an object of the present invention is to provide a vehicle control system which is capable of preventing a failure in one control unit from impeding control performed by another control unit.

Another object of the present invention is to provide a vehicle control system in which a failure in one control unit is dealt with by making possible back-up control performed by another control unit, this being achieved through an inexpensive arrangement.

According to the present invention, the foregoing objects are attained by providing a vehicle control system having a plurality of transmission lines which includes a first transmission line and a second transmission line, wherein a plurality of control units, a first actuator controlled by the plurality of control units and a first sensor which inputs a signal to the plurality of control"

units are separately and independently connected to the first transmission line, at least one control unit from among the plurality thereof is connected to the second transmission line, and a second actuator, which is controlled by the control unit connected to the second transmission line, and a second sensor, which inputs a signal to the control unit connected to the second transmission line, are connected to the second transmission line.

In a preferred embodiment, the plurality of control units control the traveling state of the vehicle.

In a preferred embodiment, the plurality of control units are provided with back-up programs for backing up other control units, whereby when any of the other control units develops a fault, its control is taken over and communication among the plurality of transmission lines is assured.

In a preferred embodiment, the plurality of control units each have a communication interface module for interfacing the first and second transmission lines.

In a preferred embodiment, the first transmission line transmits high-speed signals related to vehicle control, and the second transmission line transmits low-speed signals which correspond to operations performed by the driver of the vehicle.

In a preferred embodiment, the first actuator and the first sensor have a high degree of importance in terms of control performed by the plurality of control units, and the second actuator and the second sensor have a low degree of importance in terms of control performed by the plurality of control units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram illustrating an example of a vertical G sensor constituting a control device according to the embodiment;

FIG. 4 is a block diagram illustrating an example of an ABS/TRC solenoid constituting a control device according to the embodiment;

DESCRIPTION OF THE PREFERRED EMBODIMENT

A preferred embodiment of the present invention will now be described with reference to the accompanying drawings.

Figure 1A:
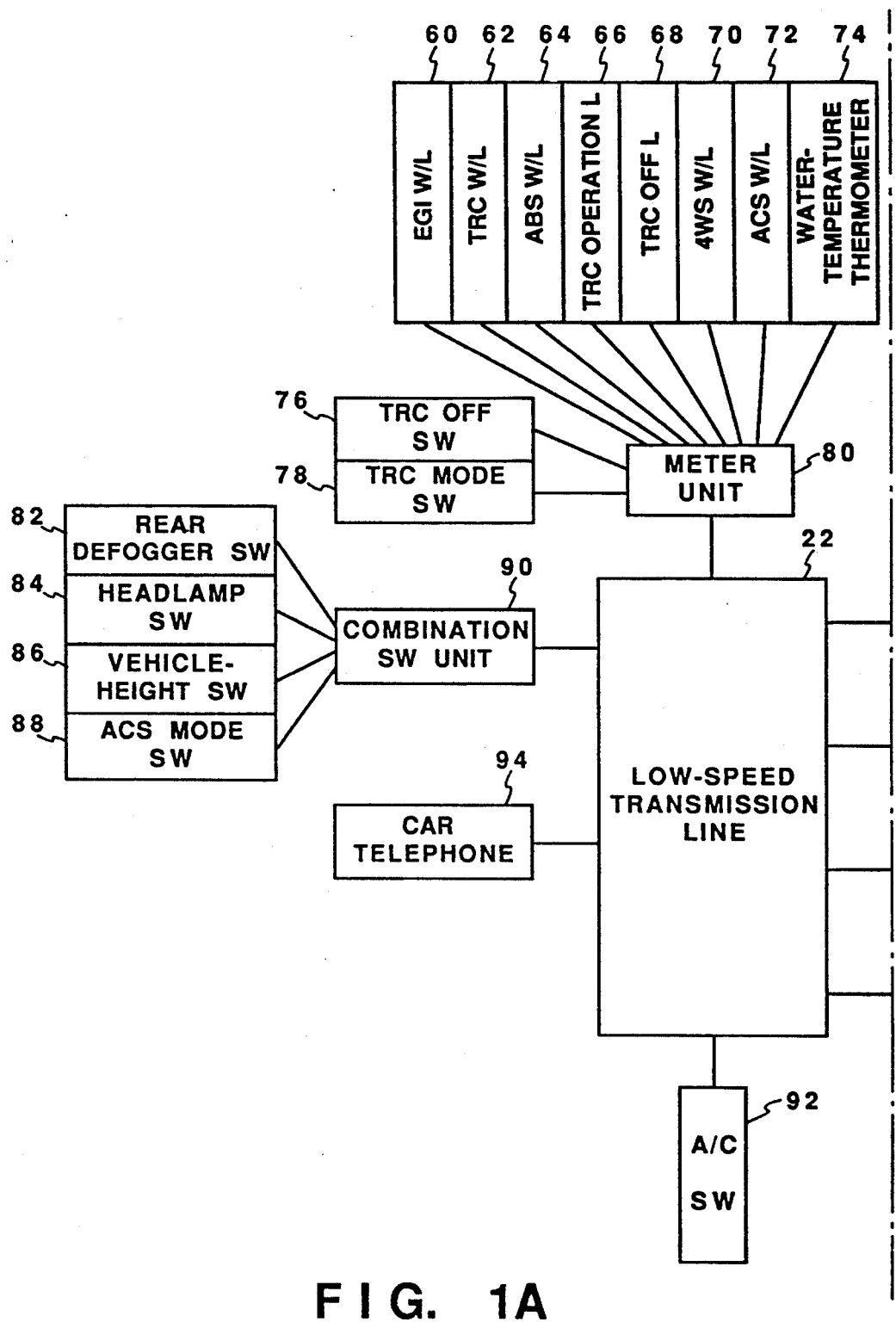
FIGS. 1A and 1B are block diagrams illustrating the overall construction of a vehicle control system according to an embodiment of the present invention.
Figure 1B:
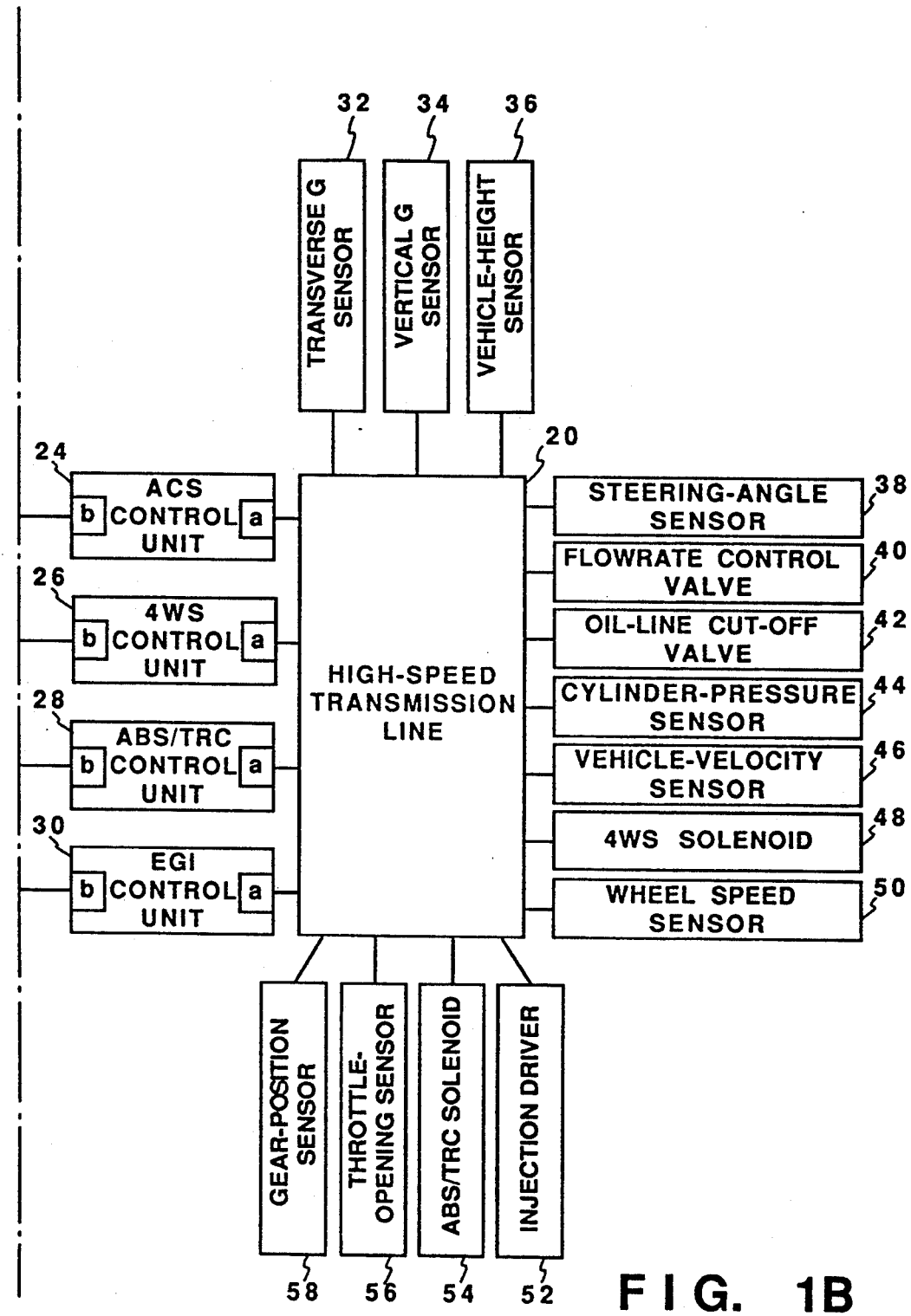

FIGS. 1A and 1B are block diagrams illustrating an embodiment of a vehicle control system according to the present invention.

The vehicle control system is provided with two multiplexed transmission lines, namely a high-speed multiplexed transmission line 20 and a low-speed multiplexed transmission line 22, each transmission line constituted by a bus in the form of a closed loop. A plurality of control units for controlling the traveling state of the vehicle, namely an ACS control unit 24, a 4WS control unit 26, an ABS/TRC control unit 28 and an EGI control unit 30 are connected to the two transmission lines 20, 22.

The transmission speed of the low-speed multiplexed transmission line 22 is less than 125 Kbit/sec, and the transmission speed of the high-speed multiplexed transmission line 20 is greater than 1 Mbit/sec.

Figure 2:
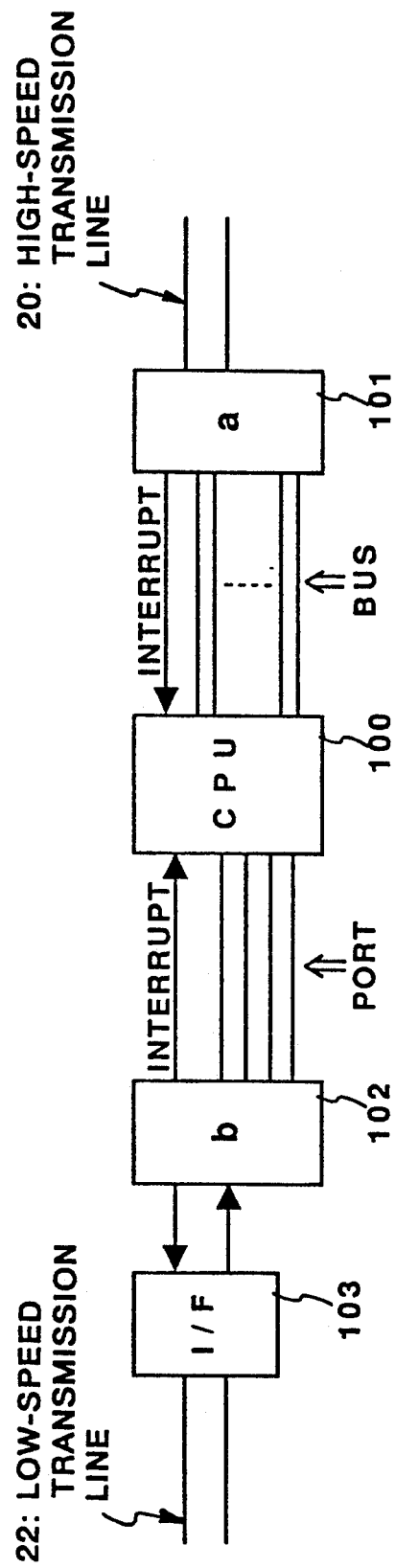
FIG. 2 is a block diagram illustrating the internal construction of a control unit.

FIG. 2 is a block diagram showing the internal construction of each of the control units 24, 26, 28, 30.

As shown by FIGS. 1A and 1B and 2, the control units 24, 26, 28, 30 are separately and independently connected to the high-speed multiplexed transmission line 20 via respective high-speed multiplexed modules (communication ICs) a. Actuators having a high degree of importance in terms of control reliability and safety, and which are controlled by the control units 24, 26, 28, 30, also are connected to the high-speed multiplexed transmission line 20. More specifically, a flowrate control valve 40 and an oil-line cut-off valve 42 (valve provided in hydraulic piping leading to a suspension damper), which are the actuators of the ACS control unit 24; a 4WS solenoid 48 (a solenoid of a hydraulic-pressure control valve used to steer the rear wheels by hydraulic pressure) and an ABS/TRC solenoid 54 (a solenoid of a valve for controlling braking hydraulic pressure), which are the actuators of the 4WS control unit 26; and an injection driver 52, which is the actuator of the EGI control unit 30; are separately and independently connected to the high-speed multiplexed transmission line 20. Further, highly important sensors 32, 34, 36, 38, 44, 46, 50, 56, 58 which apply signals to the control units 24, 26, 28, 30 are separately and independently connected to the high-speed multiplexed transmission line 20. Among these sensors, the output signals from sensors 32, 34, 36, 38, 44, 50 enter the ACS control unit 24; the output signals from sensors 38, 46 enter the 4WS control unit 26; the output signals from sensors 38, 50, 56, 58 enter the ABS/TRC control unit 28; and the output signals from sensors 56, 58 enter the EGI control unit 30.

The control units 24, 26, 28, 30 are separately and independently connected to the low-speed multiplexed transmission line 22 via a low-speed multiplexed communication module b. Actuators having a low degree of importance in terms of control reliability and safety, and which are controlled by the control units 24, 26, 28, 30, also are connected to the low-speed multiplexed transmission line 22. More specifically, various warning lamps (W/L) 60, 62, 64, 70, 72, lamps (L) 66, 68, and a water temperature thermometer 74, which are the components of meters, are connected to the multiplexed transmission line 22 via a meter unit 80; a TRC offswitch 76 and a TRC mode switch 78, which are sensors of a comparatively low degree of importance that apply their signals to the ABS/TRC control unit 28, are connected to the multiplexed transmission line 22 via the meter unit 80; a rear defogger switch 82 and a headlamp switch 84, which are sensors of a comparatively low degree of importance that apply their signals to the EGI control unit 30, as well as vehicle-height switch 86 and an ACS mode switch 88, which are sensors of a comparatively low degree of importance that apply their signals to the ACS control unit 24, are connected to the multiplexed transmission line 22 via a combination switch 90; and an air-conditioner switch 92, which is a sensor of a comparatively low degree of importance that applies its signal to the EGI control unit 30, is connected to the multiplexed transmission line 22. A car telephone 94 for mobile communication is also connected to the multiplexed transmission line 22.

As illustrated in FIG. 2, each of the control units 24, 26, 28, 30 is so adapted that a CPU 100 executes control in accordance with an ACS control program, a 4WS control program, an ABS/TRC control program and an EGI control program that are stored in a memory, which is not shown. For example, a 4WS back-up control program (e.g., a program which includes only the basic portion of an original 4WS control program) is stored in the ABS/TRC control unit.

The CPU 100 of each control unit performs control upon receiving an interrupt from a high-speed multiplexed communication module (a) 101 connected to the high-speed multiplexed transmission line 20, or from a low-speed multiplexed communication module (b) 102 connected to the low-speed multiplexed transmission line 22 via an interface (I/F) 103.

The sensors and actuators connected to the high-speed multiplexed transmission line 20 are all connected to line 20 via high-speed multiplexed communication modules, not shown. In a case where a plurality of sensors and solenoids are actually provided, as in the manner of the vertical G sensor 34 and ABS/TRC solenoid 54, furnishing a multiplexed communication module for each and every sensor and solenoid would involve great cost. Therefore, as shown in FIGS. 3 and 4, there are provided a vertical G sensor unit 300 for collectively processing output signals from G sensors 1, 2, 3 and 4, identified with reference numerals 301, 302, 303 and 304, respectively, and an ABS/TRC solenoid unit 400 for collecting processing input signals to solenoids 1, 2, 3 and 4, identified with reference numerals 401, 402, 403 and 404, respectively, and each of these units is connected to the high-speed multiplexed transmission line 20 via a single multiplexed communication module provided on the unit.

Similarly, each sensor and actuator connected to the low-speed multiplexed transmission line 22 is also connected via a respective low-speed multiplexed communication module (not shown). In particular, each of the sensors and actuators connected via the meter unit 80 and combination switch unit 90 are connected via a signal multiplexed communication module (not shown) provided on the meter unit 80 and combination switch unit 90, without the individual sensors and actuators being furnished with a multiplexed communication module.

It goes without saying that owing to limitations upon communication capacity (traffic), performing communication by speeding up all control operations using a single multiplexed line may not allow each control unit to obtain the necessary information when required. Accordingly, in view of the nature of vehicle control, control is divided into two systems, namely high-speed control and low-speed control, in accordance with the degree of importance of the particular control operation, as will be described below.

In this embodiment, therefore, two multiplexed transmission lines are provided, one of the transmission lines, namely line 20, is adopted as the high-speed line, a plurality of control units are separately connected to the transmission line 20, and the sensors and actuators having a high degree of importance as far as these control units are concerned are also separately connected to the transmission line 20. The other transmission line, namely line 22, is adopted as the low-speed line, the above-mentioned plurality of control units are connected to the transmission line 22, and the sensors and actuators having a low degree of importance as far as these control units are concerned are also connected to the transmission line 22. Furthermore, control signals corresponding to operations performed by human beings are transmitted via the low-speed transmission line 22.

First, on the side of the high-speed transmission line 20, the output signals from the sensors having a high degree of importance enter the respective control units directly via the transmission line 20 so that if any control unit malfunctions, this will not cause an output signal from a certain sensor to fail entering the other control units. Thus, there is no danger that a fault in one control unit will hinder control performed by the other control units. In addition, the control units are directly connected to the respective actuators having a high degree of importance via the transmission line 20. Therefore, if, say, the 4WS control unit 26 should happen to fail, the task of the 4WS control unit 26 is capable of being taken over by the ABS/TRC control unit 28 in which the 4WS control back-up program has been stored. In other words, the ABS/TRC control unit 28 is capable of performing 4WS back-up control.

Further, in a case where the control unit is a vehicle-travel control unit such as the 4WS or ACS control unit, generally an exchange of signals among the highly important sensors and actuators is required to be performed at high speed, whereas it will suffice for an exchange of signals among the sensors and actuators of comparatively lesser importance to be performed at low speed.

Figure 5:
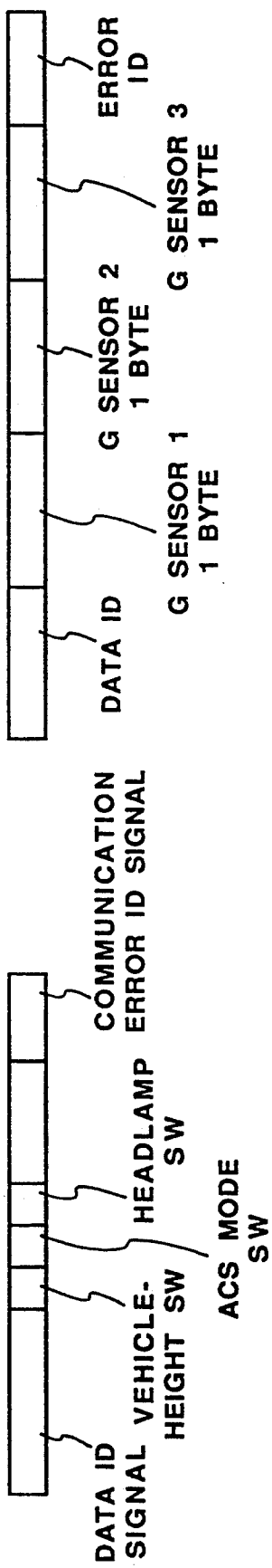
FIGS. 5A and 5B are block diagrams showing an example of communication formats in a control device according to the embodiment.

FIGS. 5A and 5B show an example of communication formats in the control system according to this embodiment, in which (A) illustrates control signals for low speed and (B) control signals for high speed.

In the low-speed signal format, one item of information corresponds to one bit. In the high-speed signal format, on the other hand, sensor information corresponds to one byte (of which there are 0–255 types). Accordingly, communication in large volume is required with regard to the high-speed signals.

A procedure for processing communication data in this embodiment will now be described with reference to the flowchart of FIG. 6.

Figure 6:
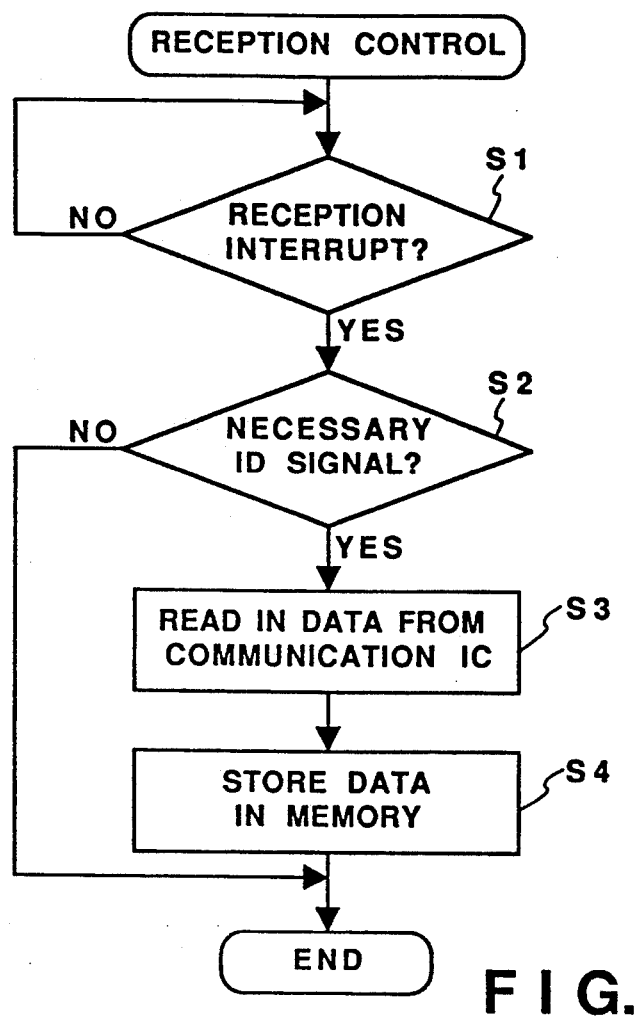
FIG. 6 is a flowchart showing the procedure of reception control.

FIG. 6 is a flowchart illustrating a reception-control procedure. At step S1 of the flowchart, the CPU 100 of each control unit determines whether there is a reception interrupt from the high-speed multiplexed communication module (communication IC) a 101 or low-speed multiplexed communication module (communication IC) b 102. When an interrupt is sensed at step S1, it is determined at step S2 whether this signal is an identification signal necessary for control. If the answer obtained at step S2 is YES, then data is read in from the communication IC at step S3. Then, at step S4, the received data is stored in a memory (not shown) and reception control is terminated.

Figure 7:
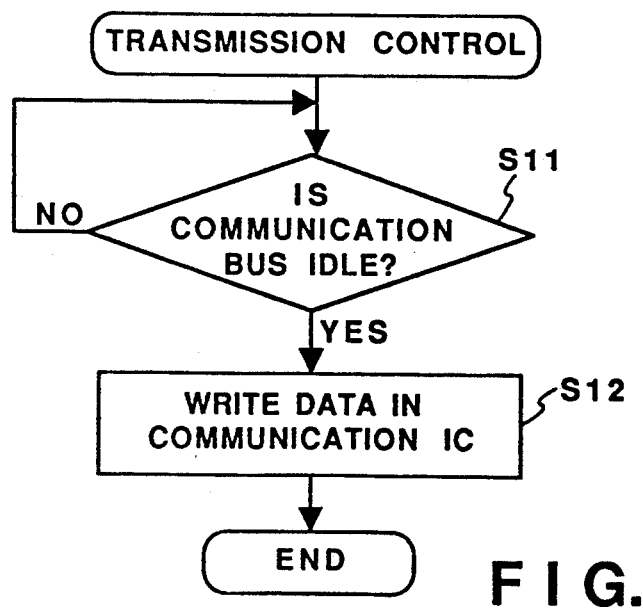
FIG. 7 is a flowchart showing the procedure of transmission control.

In transmission control, as shown in the flowchart of FIG. 7, the CPU 100 of each control unit searches for an idle communication bus, which serves as a transmission line, at step S11. If an idle bus is available, the CPU 100 writes data in the communication IC at step S12.

Changeover control at failure of a control unit in the apparatus of this embodiment will be described next.

Figure 8:
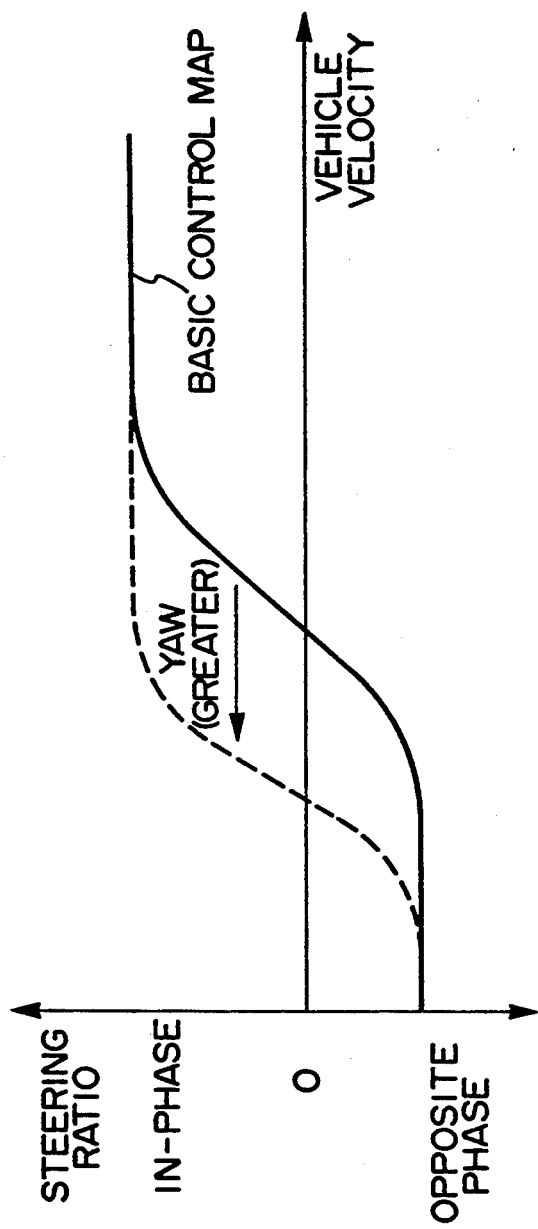
FIG. 8 is a diagram showing the relationship between vehicle velocity and steering angle in 4WS control.

By way of example, in control wherein yaw-rate information is used in basic control of 4WS in the 4WS control unit 26, control usually is executed in accordance with a basic control map indicated by the solid line in FIG. 8. In a case where a large amount of yaw is produced, control is caused to make a transition from a lower vehicle velocity to the same phase, namely toward the stable side, as indicated by the dashed line in FIG. 8.

Figure 9:
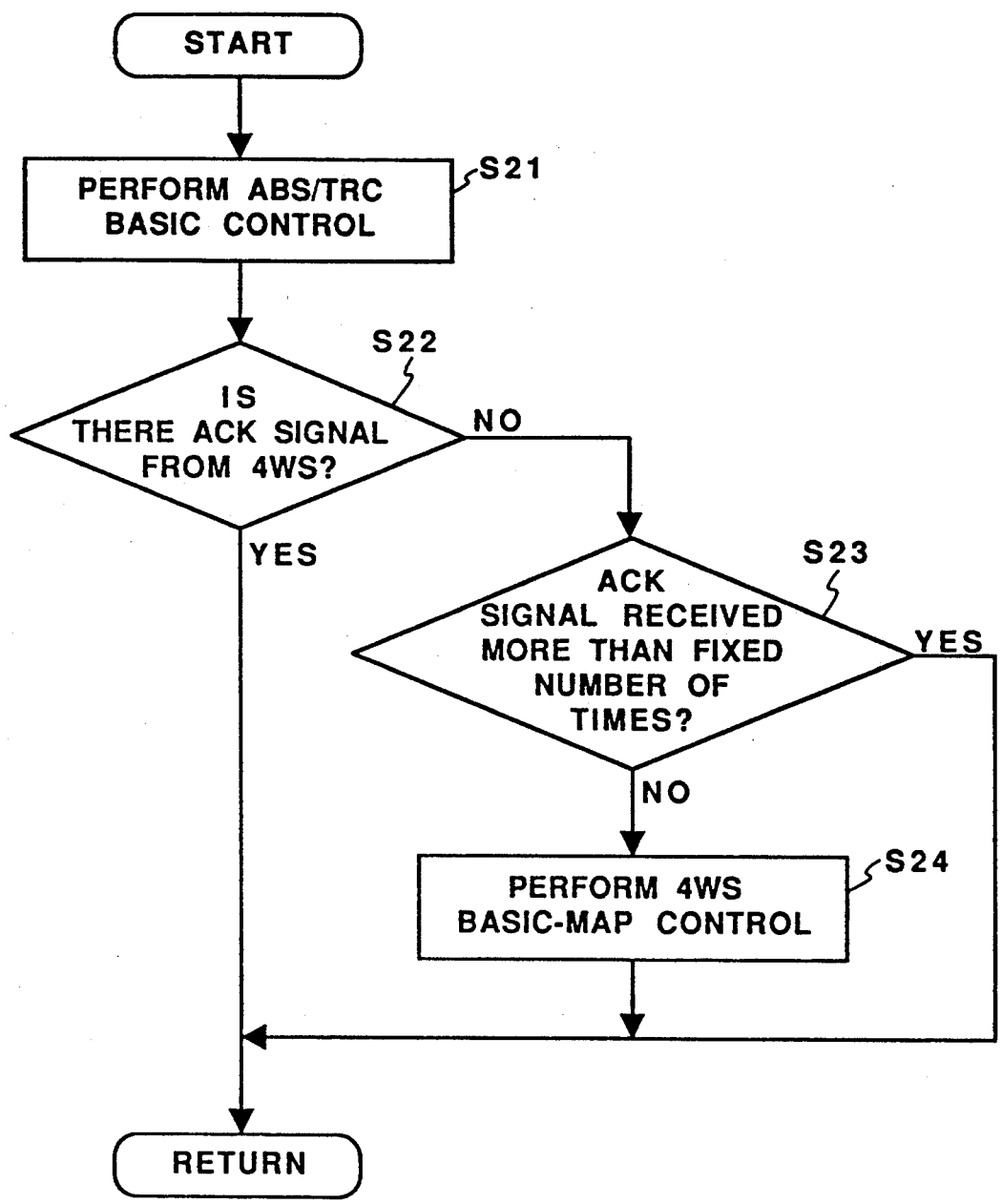
FIG. 9 is a flowchart showing a 4WS back-up control procedure of an ABS/TRC control unit.
Figure 10:
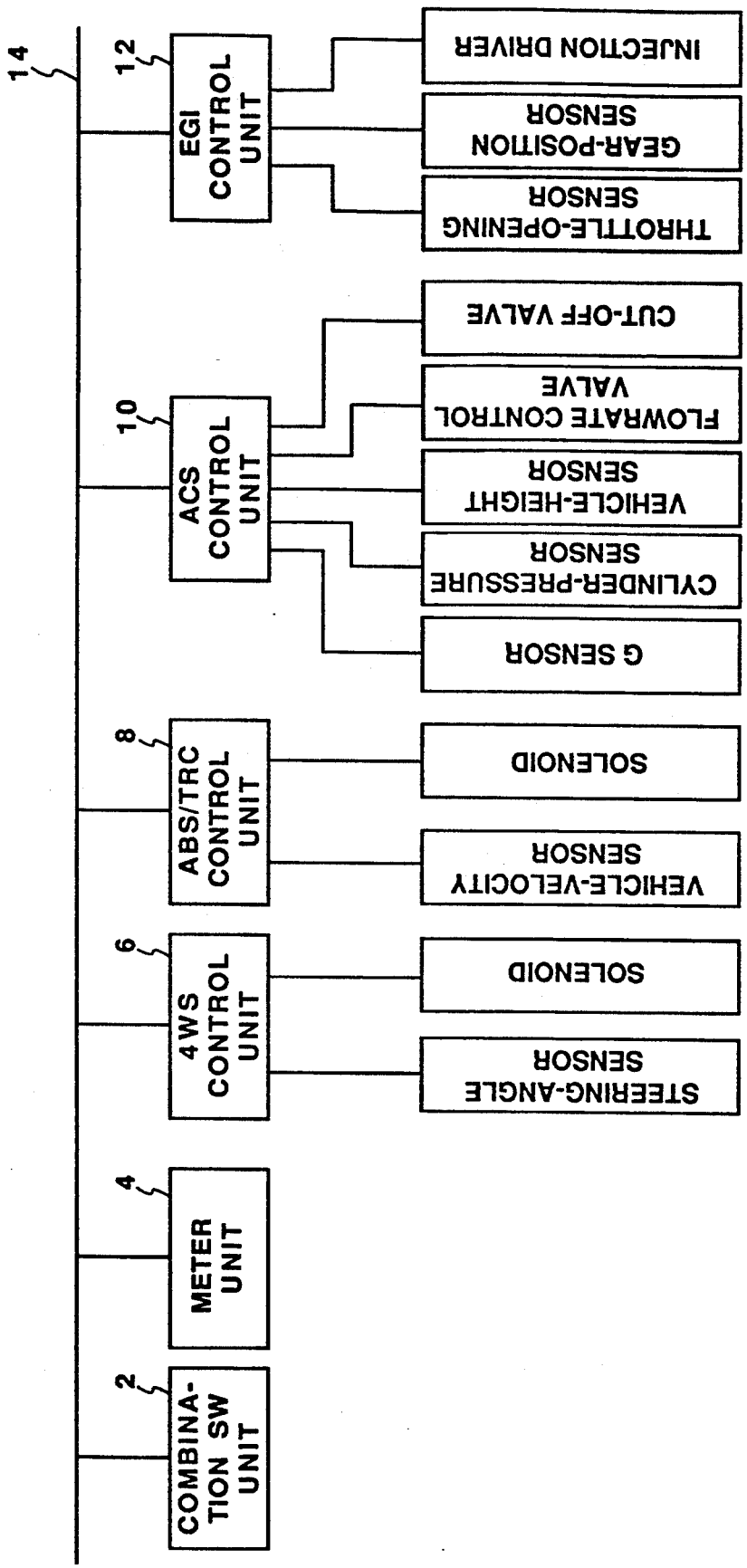
FIG. 10 is a block diagram showing an example in which a multiplexed transmission system is applied to a plurality of travel-control devices according to the prior art.

When the 4WS control unit 26 develops a fault, the ABS/TRC control unit 28 performs back-up by executing control using solely the above-mentioned basic map, as set forth above. FIG. 9 is a flowchart illustrating the procedure of back-up control performed by the ABS/TRC control unit. When there is an input of necessary data to the 4WS control unit 26 or ABS/TRC control unit 28, this unit outputs an acknowledge signal (ACK) in the same manner as the other control units.

More specifically, at step S21 in FIG. 9, the ABS/TRC control unit performs the usual basic control and determines at step S22 whether there is an acknowledge signal from the 4WS control unit. If there is an acknowledge signal, processing returns. If there is no acknowledge signal, however, it is determined at step S23 whether the acknowledge signal has been outputted more than a fixed number of times. When the acknowledge signal is incapable of being received more than the fixed number of times, a decision is made to the effect that the 4WS control unit, which is the transmission destination of the acknowledge signal, has failed. Then, at step S24, the ABS/TRC control unit executes 4WS control in accordance with the basic control map.

In accordance with the present invention, as described above, the side having a high degree of importance is adopted for high-speed transmission, and the side having a low degree of importance is adopted for low-speed transmission. As a result, an exchange of highly important signals requiring high speed can be performed at high speed without producing a delay. In addition, with regard to an exchange of less important signals for which low speed is adequate, inexpensive low-speed communication modules can be employed and the overall apparatus can be reduced in cost while maintaining the reliability and stability of control.

Furthermore, when elements are divided into those having a high degree of importance and those having a low degree of importance, and those on the high side are adopted for high speed and those on the low side for low speed, the low-speed multiplexed transmission line portion becomes exactly the same as the prior-art multiplexed transmission system associated with the body of the vehicle. As a consequence, the multiplexed transmission system can readily be expanded into one which includes travel-control devices such as ACS and 4WS while the conventional multiplexed transmission system associated with the body of the vehicle is used as is. In addition, each control unit is connected directly (i.e., without another control unit intervening) to a respective actuator, which has a high degree of importance, via a multiplexed transmission line. Therefore, to prepare for a situation in which a certain control unit fails, a back-up program for control executed by this control unit is stored in another control unit in advance, thus enabling this other control unit to back up the control unit that has failed. This also makes it possible to assure communication between low transmission lines when a failure occurs.

In the embodiment described above, all of the control units 24, 26, 28, 30 are separately connected to the low-speed multiplexed transmission line 22. However, with regard to control units for which sensors and actuators to be connected do not exist on the transmission line side, these control units need not be connected to the transmission line 22. In addition, the control units, sensors and actuators on the side of the low-speed transmission line 22 do not necessarily need to be connected separately and independently, unlike those on the side of the high-speed transmission line 20. These connections can be made in any appropriate manner.

As many apparently widely different embodiments of the present invention can be made without departing from the spirit and scope thereof, it is to be understood that the invention is not limited to the specific embodiments thereof except as defined in the appended claims.

What is claimed is:

1. A vehicle control system comprising:
   a first transmission line;
   a second transmission line;
   a first actuator and a first sensor which are separately and independently connected to said first transmission line;
   a second actuator and a second sensor which are separately and independently connected to said second transmission line;
   a control unit which is connected to said first transmission line, controls said first actuator by inputting a signal from said first sensor; and
   a plurality of control units, which are commonly connected to said first transmission line and said second transmission line and control said second actuator by inputting a signal from said second sensor, wherein said plurality of control units each backs up other control units for taking over their control when any of the other control units develop a fault.

2. The control system according to claim 1, wherein said plurality of control units each performs a discrimination of a signal from said first and second transmission lines by sending a control signal to said first and second transmission lines so as to control the traveling state of the vehicle based upon the results of the signal discrimination.

3. The control system according to claim 1, wherein said plurality of control units each have a communication interface module for independently sending and receiving signals to and from said first and second transmission lines.

4. The control system according to claim 1, wherein said first transmission line transmits signals in higher speed which are related to vehicle control and have a high degree of importance, and said second transmission line transmits signals in lower speed which correspond to operations performed by the driver of the vehicle and have a low degree of importance.

5. The control system according to claim 1, wherein said first actuator and said first sensor have a comparatively high degree of importance in terms of control performed by said plurality of control units, and said second actuator and said second sensor have a comparatively low degree of importance in terms of control performed by said plurality of control units.

* * * * *